United States Patent
Seth et al.

(10) Patent No.: US 9,268,873 B2
(45) Date of Patent: Feb. 23, 2016

(54) LANDING PAGE IDENTIFICATION, TAGGING AND HOST MATCHING FOR A MOBILE APPLICATION

(75) Inventors: Siddharth Seth, Bangalore (IN); Sudhir Kumar Rama Rao, Bangalore (IN); Bangalore Subbaramaiah Prabhakar, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 1195 days.

(21) Appl. No.: 11/611,002

(22) Filed: Dec. 14, 2006

(65) Prior Publication Data

US 2008/0040389 A1 Feb. 14, 2008

(30) Foreign Application Priority Data

Aug. 4, 2006 (IN) .............................. 780/KOL/2006

(51) Int. Cl.
*G06F 17/30* (2006.01)
(52) U.S. Cl.
CPC ................................ *G06F 17/30905* (2013.01)
(58) Field of Classification Search
CPC ................................................. G06F 17/30905
USPC ........................ 707/100–104.1, 999.1–104.1, 707/99.1–104, 710, 711
See application file for complete search history.

(56) References Cited

U.S. PATENT DOCUMENTS

| | | | |
|---|---|---|---|
| 6,606,654 B1 * | 8/2003 | Borman et al. ............... | 709/219 |
| 6,922,670 B2 * | 7/2005 | Yamada et al. ............ | 704/270.1 |
| 7,340,472 B2 * | 3/2008 | Makus et al. .................. | 707/100 |
| 7,680,899 B1 * | 3/2010 | Barnes et al. .................. | 709/217 |
| 2004/0260679 A1 * | 12/2004 | Best et al. ......................... | 707/3 |
| 2006/0041553 A1 * | 2/2006 | Paczkowski ...... | G06F 17/30884 |
| 2007/0027754 A1 * | 2/2007 | Collins .............. | G06Q 10/0631 |
| | | | 705/14.48 |
| 2007/0038614 A1 * | 2/2007 | Guha ................. | G06Q 30/0256 |
| 2007/0061245 A1 * | 3/2007 | Ramer et al. ..................... | 705/37 |
| 2007/0239724 A1 * | 10/2007 | Ramer ............. | G06F 17/30864 |
| 2008/0010142 A1 * | 1/2008 | O'Brien ............ | G06F 17/30864 |
| | | | 705/14.72 |

OTHER PUBLICATIONS

"Landing page", Wikipedia, downloaded from: en.wikipedia.org/wiki/Landing_page on Oct. 13, 2105, pp. 1-2.*

(Continued)

*Primary Examiner* — Robert Stevens
(74) *Attorney, Agent, or Firm* — James J. DeCarlo; Greenberg Traurig, LLP

(57) ABSTRACT

A system, apparatus, and method are disclosed to provide an enhanced search index for searchable content by limited capability devices, such as mobile phones. A URL analyzer determines clusters of mobile web page URLs and corresponding tokens. A landing page identifier evaluates cluster URLs and the tokens to identify landing page URLs for mobile web pages likely to be relevant to an associated search term. A mapper associates the landing page URLs with related domain hosts that include conventional web pages generally not accessible to limited capability devices. A category tagger associates the landing page URLs with categories of conventional web pages that share a content topic. The landing page URLs, and corresponding tokens, domain host information, and categories are added to the search index. A submitted search term is evaluated relative to the tokens, domain host information, and categories to determine relevant mobile web landing pages as search results.

21 Claims, 4 Drawing Sheets

(56) References Cited

OTHER PUBLICATIONS

"Landing page optimization", Wikipedia, downloaded from: en.wikipedia.org/wiki/Landing_page_optimization on Oct. 13, 2105, pp. 1-4.*

"Uniform Resource Locator", Wikipedia, downloaded from: en.wikipedia.org/wiki/ Uniform_Resource_Locator on Oct. 13, 2105, pp. 1-5.*

"User agent." "*Wikpedia, The Free Encyclopedia*" (2007) (accessed Feb. 21, 2007), 21:14 UTC, Wikimedia Foundation, Inc. <http://en.wikipedia.org/w/index.php?title=User_agent&oldid=109646925>, 14 pages.

\* cited by examiner

LANDING PAGE IDENTIFICATION, TAGGING AND HOST MATCHING FOR A MOBILE APPLICATION

CROSS-REFERENCE TO RELATED APPLICATIONS

This application claims the benefit of Indian Application Serial No. 780/KOL/2006 filed on Aug. 4, 2006, which is hereby incorporated by reference.

BACKGROUND

This invention relates generally to network communications, and more particularly but not exclusively, to determining search results of web sites relevant to use by limited capability mobile devices.

Many mobile computing devices, such as personal digital assistants, cellular phones, and the like, may be employed to communicate voice messages, emails, text messages, and so forth. These limited capability mobile computing devices are becoming increasingly common, and many people are also using these mobile devices to search for information over the Internet. It is not uncommon to see a person on a bus, train, or even a boat, using their mobile device to search for merchants, restaurants, music, or the like. However, accessing such information typically requires conventional web pages and/or conventional web services to be reduced, reformatted, or otherwise specially configured for display or other use by limited capability mobile devices. This mobile web data may be stored separately from, or dynamically generated from, conventional web pages and/or web services.

Conventional web pages, services and other data are generally designed to be accessed through a larger viewing area with a conventional browser application running on a general purpose computing device. For example, a hypertext markup language (HTML) web page can be displayed with a Mozilla® Firefox® browser running on a personal computer. There is often extensive anchor text and metadata associated with conventional web data, which has been developed over the years to help identify and organize conventional web data. Web crawlers and other analysis tools have also been used to determine links and other relationships between web pages, web sites, web service, and other conventional web data. An individual web site may further organize conventional web data into numerous hosts, each of which is associated with a particular topic, such news, sports, travel, entertainment, and the like. Host trust information and other meta information is typically available for various conventional web hosts. This information provides some rating of a given domain and has been collected over a period of time, and from a vast source of conventional web data, and is hence considered to be reliable information.

However, mobile web pages and other mobile web data typically have less metadata, less content, less overall quantity, and less accessibility. A consequence is that mobile web data is generally not as well interrelated and not as well organized. For example, mobile web data may be organized with simple paths of a single domain rather than being organized with hosts. In addition, the formatting and structure of mobile web data is generally incompatible with general purpose browsers, and conventional web data is generally incompatible with mobile device browsers. For example, many mobile devices use a wireless application protocol (WAP) and display wireless markup language (WML) web pages that are not compatible with conventional browsers that operate on a PC. Worse yet, naming conventions may be inconsistent between mobile web sites, mobile web pages, mobile web services, and other mobile web data. With these limitations, a mobile device user may be unable to readily search for and locate information that is accessible with only a limited capability mobile device. Accordingly, there is a need in the industry to provide mobile device users with an improved mechanism for searching and locating web content with their mobile device.

However, simply duplicating the data structures, organizations, and tools used for conventional web data will not necessarily work for mobile web data configured for limited capability mobile devices. Moreover, duplicating a conventional web data system is inefficient, since the host trust information and other aspects of the conventional web data system already exist, but are not necessarily associated with mobile web data. Even if a conventional web data system were duplicated for mobile web data, it would not operate efficiently, since the mobile web data is generally not interlinked well. Therefore, it is with respect to these considerations and others that the present invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION

Figure 1:
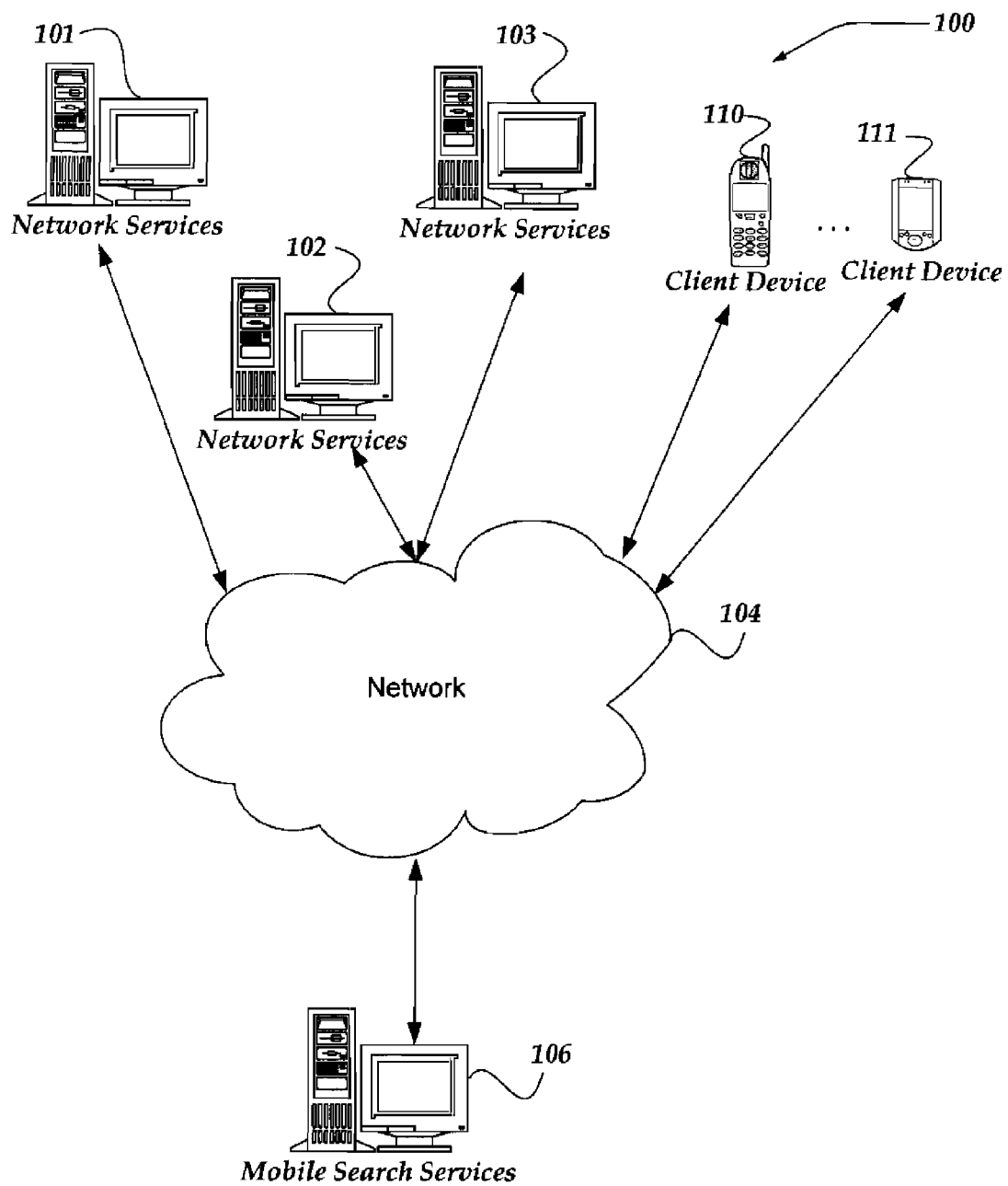
FIG. 1 shows a functional block diagram illustrating one embodiment of an environment for performing mobile web searching.

Embodiments of the present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" or "in an example embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In this specification, the term "client" refers to a computing module's general role as a requester of data or services, and the term "server" refers to a computing module's role as a provider of data or services. In general, it is possible that a computing module can act as a client, requesting data or services in one transaction and act as a server, providing data or services in another transaction, thus changing its role from client to server or vice versa.

The term "URL" generally refers to a uniform resource locator, but may also include a uniform resource identifier and/or other address information. A URL generally identifies a protocol, such as hypertext transfer protocol (e.g., "http://"), a host name (e.g., "news.yahoo.com," "sports.yahoo.com," "travel.yahoo.com," "entertainment.yahoo.com," etc.) or a domain name (e.g., "yahoo.com"), a path (e.g., "/mobile/bbc_news/politics"), and a query string (e.g., "?d=quot") or a specific file (e.g., "story5228782.wml").

The term "mobile web" generally refers to a collection of devices, data, and/or other resources that are accessible over a network according to one or more protocols, formats, syntax, and/or other conventions that are intended for use with specialized or otherwise limited capability devices, such as mobile phones, personal digital assistants (PDAs), palm-top computers, portable music devices, and the like. Mobile web protocols include, but are not limited to, the wireless application protocol (WAP). Such conventions include, but are not limited to, wireless markup language (WML) and extensible hypertext markup language (XHTML). The terms "mobile web page" and "mobile web data" generally refer to a document, file, application, service, and/or other data that conforms to mobile web conventions and is generally accessible with a limited capability device running a limited capability application such as a micro browser. Example micro browsers include Explorer Micro™ from Microsoft Corporation Opera Mini™ from Opera Software ASA, and Fusion WebPilot™ from DSPOS, Inc.

The term "conventional web" generally refers to a collection of devices, data, and/or other resources that are accessible over a network according to one or more protocols, formats, syntax, and/or other conventions that are intended for use with general purpose devices, such as personal computers, laptop computers, workstations, servers, mini computers, mainframes, and the like. Conventional web protocols include, but are not limited to, the hypertext transfer protocol (HTTP). Such conventions include, but are not limited to, hypertext markup language (HTML) and extensible markup language (XML). The terms "conventional web page" and "general web data" generally refer to a document, file, application, service, and/or other data that conforms to conventional web conventions and is generally accessible with a general purpose computing device running a full capability application such as a general purpose browser. Example general purpose browsers include Internet Explorer™ from Microsoft Corporation, Netscape™ from Netscape Communications Corp., and Firefox™ from the Mozilla Foundation. Conventional web pages are generally indexed by search engines that are able to access conventional web pages, but may have limited, or no ability to access mobile web pages. An example search engine is Yahoo Search™ by Yahoo, Inc.

The term "conventional web host" generally refers to a host associated with a network domain that includes conventional web pages. The term "host trust" generally refers to a score, rating, and/or other attribute associated with a host. A host trust value generally provides an indication of a popularity, trustworthiness, reliability, quality, and/or other characteristic of a host.

The term "landing page" generally refers to a mobile web page that provides information relating to a particular subject and/or provides links to other web pages relating to the same subject. A landing page generally identifies a web page within a web site, but may refer to other web pages. A home page, an index page, and/or other higher level web page may be a landing page. The term "landing page" may refer to a conventional web page with similar characteristics in relation to conventional web pages. Unless the context surrounding the use of the term "landing page" indicates a conventional web page, the term "landing page" will generally be used herein with regard to mobile web pages.

Briefly stated, the invention is directed towards a system, apparatus, and method for providing an enhanced search index of mobile web data utilizing information related to conventional web data to determine the relevance of the mobile web data. When a mobile user requests a search of mobile web data, appropriate mobile web landing pages are determined and returned to a mobile device, based at least in part on information associated with conventional web data.

Illustrative Operating Environment

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes domain sites 101-103, client devices 110-111, a network 104, and a Mobile Search Service Server 106. Network 104 is in communication with and enables communication between each of domain sites 101-103, client devices 110-111, and MSS server 106.

Client devices 110-111 may include virtually any computing device capable of receiving and sending a message over a network, such as network 104, to and from another computing device, such as domain sites 101-103, each other, and the like. The set of such devices generally includes mobile devices that are usually considered more specialized devices with limited capabilities and typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. However, client devices 110-111 may be any device that is capable of connecting using a wired or wireless communication medium such as a personal digital assistant (PDA), POCKET PC, wearable computer, and any other device that is equipped to communicate over a wired and/or wireless communication medium. The set of client devices may also include devices that are usually considered more general purpose devices and typically connect using a wired communications medium at one or more fixed location such as laptop computers and the like. Such general purpose devices may communicate with the limited capability device, such as through a translation service.

Each client device within client devices 110-111 may include a user interface that enables a user to control settings, and to instruct the client device to perform operations. Each client device also includes a client user agent that enables the client device to send and receive messages to/from another computing device employing the same or a different communication means, including, but not limited to SMS, MMS, IM, internet relay chat (IRC), Mardam-Bey's internet relay chat (mIRC), Jabber, email, and the like.

Client devices 110-111 may be further configured with a browser application that is configured to receive and to send content in a variety of forms, including, but not limited to markup pages, web-based messages, audio files, graphical files, file downloads, applets, scripts, and the like. The browser application may be configured to receive and display graphics, text, multimedia, and the like, employing virtually any mobile markup based language or Wireless Application Protocol (WAP), including, but not limited to a Handheld Device Markup Language (HDML), such as Wireless Markup Language (WML), WMLScript, JavaScript, EXtensible HTML (XHTML), or the like. General purpose client devices may use a browser application configured to receive and display graphics, text, multimedia, and the like, employing virtually any conventional markup based language or conventional web protocol, including, but not limited to Standard Generalized Markup Language (SGML), HyperText Markup Language (HTML), Extensible Markup Language (XML), and the like. The browser application is another example, of a user agent.

Because each client device within client devices 110-111 may vary in size, shape, and capabilities, client devices 110-111 may also be configured to provide device profile information about its capabilities including whether the client device is capable of receiving particular types of audio files, graphical files, web-based files, and the like. Client devices 110-111 may also provide device profile information that may include an available application on the client device, version information, and other information about the device. In one embodiment, such information may include information such as the client device's network protocol capabilities. Various client applications may employ different network protocols. Thus, in one embodiment, a mobile device profile can also be used to obtain a mobile client's user agent capabilities. For example, a user agent capability may be obtained based, in part, on information in a standardized user agent profile, such as that defined by the User Agent Profile Specification available from the Wireless Application Protocol Forum, Ltd., Composite Capability/Preference Profiles (CC/PP), defined by the World Wide Web Consortium, or the like.

Client devices 110-111 may also provide an identifier. The identifier may employ any of a variety of mechanisms, including a device model number, a carrier identifier, a mobile identification number (MIN), and the like. The MIN is often a telephone number, a Mobile Subscriber Integrated Services Digital Network (MS-ISDN), an electronic serial number (ESN), or other device identifier. In one embodiment, the identifier, and the device profile information is sent with each message to another computing device. However, the invention is not so limited, and the identifier and device profile information may be sent based on a request for such information, an event, or so forth.

Network 104 is configured to couple one computing device to another computing device to enable them to communicate. Network 104 is enabled to employ any form of medium for communicating information from one electronic device to another. Also, network 104 may include a wireless interface, such as a cellular network interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize cellular telephone signals over air, analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 104 includes any communication method by which information may travel between client devices 110-111, domain sites 101-103, and/or mobile search services server 106. Network 104 is constructed for use with various communication protocols including wireless application protocol (WAP), transmission control protocol/internet protocol (TCP/IP), code division multiple access (CDMA), global system for mobile communications (GSM), and the like.

The media used to transmit information in communication links as described above generally includes any media that can be accessed by a computing device. Computer-readable media may include computer storage media, wired and wireless communication media, or any combination thereof. Additionally, computer-readable media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as acoustic, RF, infrared, and other wireless media, and wired media such as twisted pair, coaxial cable, fiber optics, wave guides, and other wired media.

Domain servers 101-103 include virtually any network device that may be configured to provide content over a network. In one embodiment, domain servers 101-103 are configured to operate as a website server. Thus, in one embodiment, domain servers 101-103 may provide access to content using a domain name. Moreover, such content may typically be configured for viewing using a variety of user agents, including web browsers, or the like. Some of the content may be configured to be specifically viewable by mobile user agents, while other content may be un-viewable by mobile user agents. In one embodiment, some of the content may be viewable by particular mobile user agents, while un-viewable by another mobile user agent. In one embodiment, domain servers 101-103 may organize at least some of its content based on a host name.

Domain servers 101-103 are not limited to web servers, and may also operate a conventional web search server, a messaging server, a File Transfer Protocol (FTP) server, a database server, application server, and the like. Devices that may operate as domain servers 101-103 generally include personal computers desktop computers, multiprocessor systems, microprocessor-based or programmable consumer electronics, network PCs, servers, and the like. However, limited capability devices may be able to access some information and/or services from domain servers 101-103.

One embodiment of mobile search services server 106 is described in more detail below in conjunction with FIGS. 2-3. Briefly, however, mobile search services server 106 includes virtually any network device that may be configured to provide search index for mobile web data. Mobile search services server 106 may employ a web crawler to locate at least some potentially useable mobile web data. Moreover, in one embodiment, mobile search services server 106 may perform at least some of its actions using a process substantially similar to that described below in conjunction with FIG. 4.

Although mobile search services server 106 is illustrated as a single network device, the invention is not so limited. For example, mobile search services server 106 may be implemented using several network devices, without departing from the scope of the invention. Devices that may operate as mobile search services server 106 include personal computers desktop computers, multiprocessor systems, microprocessor-based or programmable consumer electronics, network PCs, servers, and the like.

Illustrative Server Device

Figure 2:
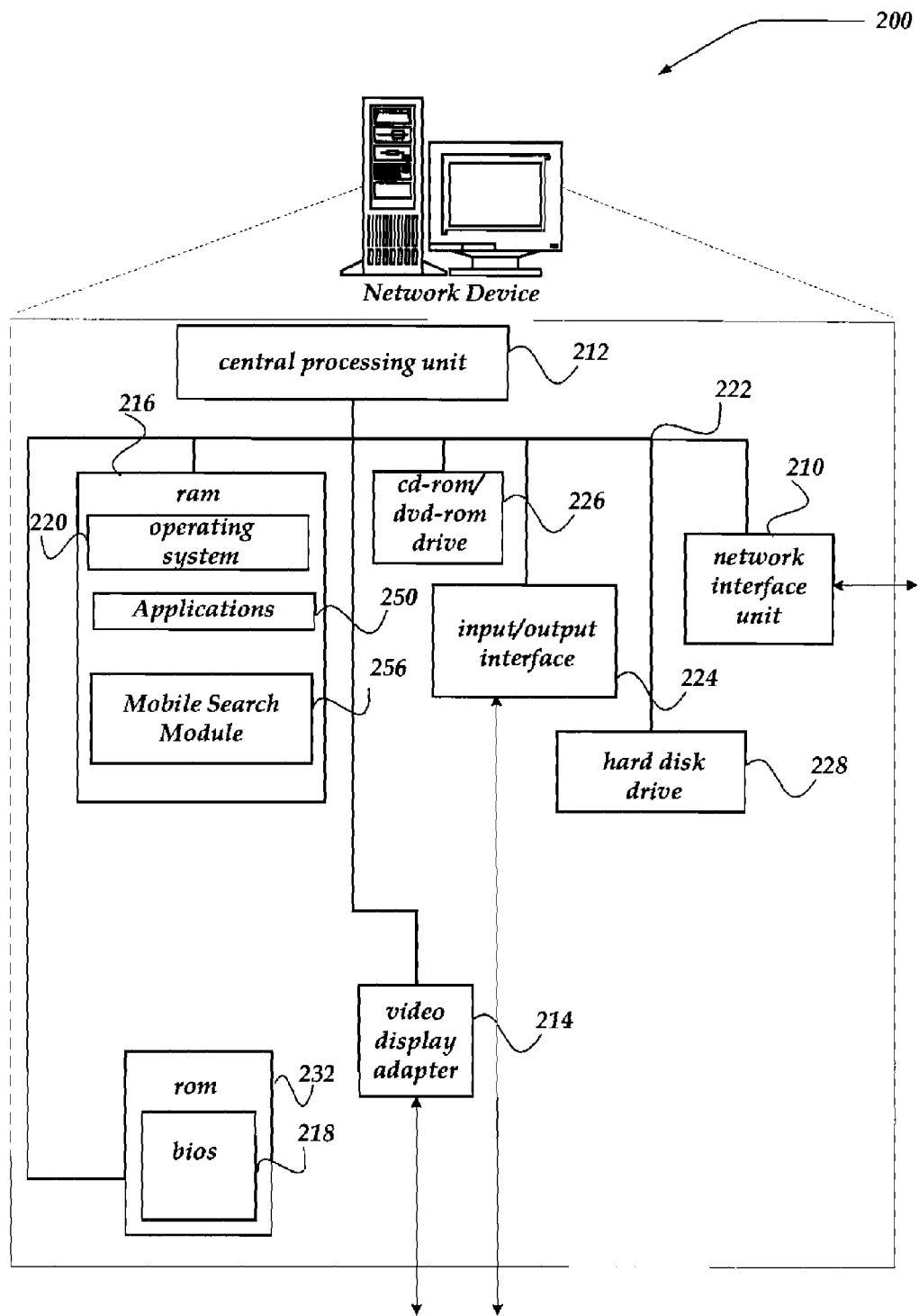
FIG. 2 shows one embodiment of a server device that may be included in a system implementing the invention.

FIG. 2 shows one embodiment of a network device, according to one embodiment of the invention. Network device 200 may include many more or less components than those shown. For example, network device 200 may operate as a network appliance without a display screen. The components shown, however, are sufficient to disclose an illustrative embodiment for practicing the invention. Network device 200 may, for example, represent mobile search services server 106 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including the TCP/IP protocol. Network interface unit 210 is sometimes known as a transceiver, transceiving device, network interface card (NIC), or the like.

Network device 200 may also include an SMS handler and/or other mobile messaging handler for transmitting and receiving messages to and from limited capability devices, such as search requests from cell phones. Network device 200 may also include an SMTP handler application for transmitting and receiving email. Network device 200 may also include an HTTP handler application for receiving and handling HTTP requests, and an HTTPS handler application for handling secure connections. The HTTPS handler application may initiate communication with an external application in a secure fashion.

Network device 200 also may include input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 is utilized by network device 200 to store, among other things, application programs, databases, or the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, transcoders, database programs, word processing programs, spreadsheet programs, security programs, web servers, web crawlers, and so forth. Mass storage may further include applications such as Mobile Search Module (MSM) 256.

MSM 256 is described in more detail below in conjunction with FIG. 3. Briefly, however, MSM 256 is configured to provide a search index for searches of domains, host sites, and other web sites that are viewable using a limited capability device. In addition, MSM 256 may include with a searchable list of the domains, information identifying at least one mobile user agent that may be used to view content at the domain. Although MSM 256 is illustrated as a single component the invention is not so limited. MSM 256 may, in another embodiment, be implemented as distinct components, as illustrated in FIG. 3, and/or across one or more network devices, such as network device 200. Moreover, MSM 256 may employ processes such as described below in conjunction with FIG. 4 to perform at least some of its actions.

Illustrative Architecture

Figure 3:
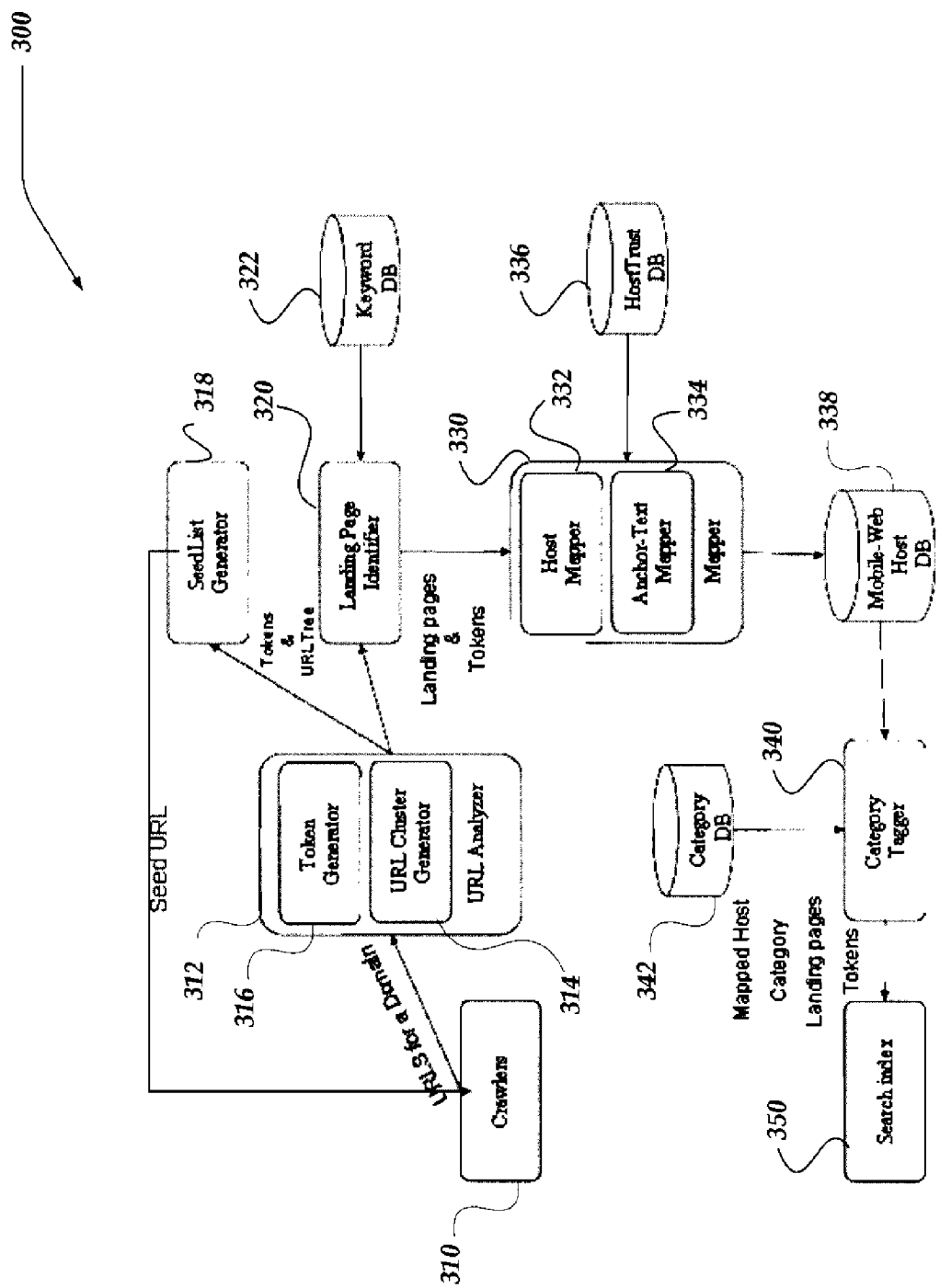
FIG. 3 shows a functional block diagram illustrating one embodiment of components for use in performing a mobile web search.

FIG. 3 shows a functional block diagram 300 illustrating one embodiment of components for use in performing a mobile web search. The components may be combined and executed on a single machine, executed as separate modules on a single machine, and/or distributed over many machines. One or more mobile web crawlers 310 access, identify, and analyze mobile web pages and other mobile web data. Mobile WebCrawler 310 is generally used to access, identify, and analyze mobile web data without analyzing conventional web data. However, mobile WebCrawler 310 may access, identify, and analyze conventional web data in the process of accessing mobile web data.

Mobile web crawler 310 communicates URLs to a URL Analyzer 312, which parses and evaluates the URLs to determine shared characteristics. In an exemplary embodiment, the URL analyzer evaluates the URLs of an individual domain to determine shared characteristics of URLs from that domain.

URL Analyzer 312 may include multiple components. One component comprises a URL Cluster Generator 314. For a given domain, the URL Cluster Generator determines clusters of mobile web URLs that have one or more shared characteristics. For example, the URL Cluster Generator may evaluate the frequency at which URLs of mobile web pages in the domain have the same directory path, the same query string, and/or other shared characteristics. Each cluster may be represented by a mobile web URL that is a highest level of a directory path that is shared by all of the URLs in the cluster. This URL may be referred to as a cluster URL, and the level generally corresponds to a node in a URL tree. The URL Cluster Generator may create the URL tree based on the determined clusters or access tree information obtained during prior evaluations.

In this embodiment, URL Analyzer 312 also includes a Token Generator 314, which evaluates the mobile web URLs to determine one or more keywords and/or other tokens that correspond to the characteristics of the URLs in a cluster. For example, a cluster of URLs may share a subdirectory name in their paths, such as "tennis." Token Generator 314 may select the subdirectory name as a token to partially identify that cluster. The Token Generator may also evaluate sub-clusters and/or higher level clusters to determine one or more tokens to be associated with the current cluster. A keyword or other token may later be used to associate one or more of the mobile web URLs with one or more categories of conventional web pages. A category may be associated with a trusted host and/or domain. The category may be provided as an additional link or parameter in a search result list of mobile web pages.

The URL Analyzer communicates with a Landing Page Identifier 320, which evaluates cluster URLs representing one or more clusters associated with a particular domain. The Landing Page Identifier identifies one or more mobile web URLs (from each cluster) as potential landing pages that may be included in a search index of documents which may be displayed on a mobile device. The selected URLs correspond to mobile web pages and/or other mobile web data that are likely to provide content and/or links to other mobile web data that is relevant to a search request. These mobile web pages are generally referred to as landing pages. A landing page is generally considered a page within a site which provides information about a specific subject, and/or also links to multiple other pages about the same subject. For example, a home page could be considered a landing page. A root page of a particular host within a domain may also be a landing page. As a contrasting example, a mobile web page of a particular journal article may not be a useful result, because it may not provide links to other related information. However, this determination may depend on a search term submitted through the mobile device. If the submitted search term substantially matches a file name, a low level parameter of a URL or page contents of a low level URL, a corresponding mobile web page may be a good search result.

Landing Page Identifier 320 may use various criteria to determine which URLs correspond to landing pages. The criteria may include cluster information identifying a high-level URL in a URL tree for a cluster; a threshold number of URLs that are at a lower level in a URL tree for a cluster; one or more predefined keywords in a URL that relate to mobile web data (e.g., "mobile"); a file name or file name extension (e.g., "index.wml"); a path parameter (e.g., "home"); a path length; a query string length; security protocol indicator (e.g., "https:"); and the like. For example, a search request based on a query term of "tennis" may identify the following URLs:

http://news.bbc.co.uk/mobile/bbc_sport/tennis/522/52287/story5228782.wml?

http://news.bbc.co.uk/mobile/bbc_sport/tennis

The first URL corresponds to a mobile web page comprising a specific article about tennis. The second URL corresponds to a higher level mobile web page (e.g., "index.wml" by default), which is likely to comprise links to other individual articles about tennis, and hence the second URL would be tagged as a landing page.

In addition, if landing pages are found within different clusters at the same depth having similar structure, Landing Page Identifier 320 may find URLs in other clusters at the same depth, for which no landing page has been identified. A URL at that same depth in another cluster may then be identified as a landing page. An alternate embodiment may further evaluate the content of the mobile web page for a number of links to other URLs, which indicates that the mobile web page is a good candidate to be a landing page.

Keywords and/or other tokens stored in a keyword database 322 may also be compared with parameters of URLs to determine landing pages. Conversely, keywords and/or other tokens from URLs of identified landing pages may be stored in keyword database 322. A keyword associated with a landing page may later be applied to other clusters, which may not include a landing page. For example, URL Cluster Generator 314 may determine a small cluster of URLs with a shared query string. However, the query string may not be easy to associate with a category of conventional web pages. Instead of keeping the query string as a token, a keyword from a higher level cluster may be applied to the small cluster of URLs with the shared query string.

Also in communication with URL Analyzer 312 and/or with Landing Page Identifier 320, is a Seed List Generator 318. If a URL has not been detected in the past by the crawler it can not already be identified and stored as a landing page. Seed List Generator 318 also considers cluster URLs which may not have been seen by the crawler. Some cluster URLs may be nodes in the cluster tree. A node may be identified by just structure of the tree, and may not actually be a URL for a page identified by the crawler. Such a node/cluster URL is considered as a potential seed URL, and may be worthy of further investigation. Seed List Generator 318 may determine whether the mobile web data of a new URL is valid, and/or may provide a list of URLs/nodes back to Crawler 310 for evaluation. If the mobile web data is valid, Seed List Generator 318 communicates the URL back to Crawler 310 to use as a seed. In such cases, these URLs would be available for evaluation of the Landing Page Identifier 320 in the future, which may enhance the comprehensiveness of the search index Landing Page Identifier 320 further communicates with a Mapper 330, which attempts to identify conventional web hosts that may be related to the URLs of landing pages. In a particular embodiment, the Landing Page Identifier maps a landing page URL to a conventional web host that has the same domain name as the landing page URL. Although this may provide access to conventional web pages, another use for the mapping is to identify related conventional web hosts that can be checked for reliability, quality of content, ratings and/or other metadata. For example, since ratings data is generally not available for mobile web data and services, the ratings of a related conventional web host can be checked to provide some indication of a rating for the corresponding mobile web landing pages. A reliability rating associated with the landing pages can help to prioritize a search index for mobile web data.

Mapper 330 includes a Host Mapper 332, which uses keywords and/or other tokens to determine a conventional web host. Keywords generated by mobile web URL clustering are matched against keywords present in conventional web host names for hosts of a related domain. For instance, the following two URLs are related by the same domain:

http://wap.oa.yahoo.com/raw?dp=travel http://travel.yahoo.com

The first URL above illustrates a mobile web landing page that conforms to WAP. The second URL above identifies a conventional web host, "travel.yahoo.com," in the same domain "yahoo.com" as the mobile web landing page. The first URL can be mapped to the host identified in the second URL by the token "travel." In the first URL, the keyword corresponds to a query parameter, and may appear frequently, such as in many of the mobile web URLs in a corresponding cluster. In the second URL, the keyword corresponds to the conventional web host name. The keyword may be included in a list of hosts associated with the domain. Such lists may be obtained from Crawler 310 and/or stored in Host Trust Database 336, which generally includes reliable trust information about conventional web hosts. In addition, or alternatively, the position of the keyword being matched in the host name may be considered while generating this mapping.

In some cases, a keyword match is not possible, or is not close enough to be confident in the match. As an alternative, or to improve confidence, Mapper 330 includes an Anchor Text Mapper 334, which uses metadata associated with conventional web hosts. Anchor text is generally the visible text in a hyperlink. Anchor Text Mapper 334 evaluates one or more keywords from a mobile web URL (determined during clustering) in relation to anchor text and/or other metadata of a conventional web host that is in a related domain. For example, the following two URLs may be determined to be related:

http://wap.oa.yahoo.com/raw?dp=quot
http://finance.yahoo.com

The first URL above corresponds to a mobile web landing page, and includes a query parameter, "quot," that is considered a keyword. The second URL above identifies the root of a conventional web host, "finance.yahoo.com," in the same domain "yahoo.com" as the mobile web landing page. The keyword "quot" is not identical to the conventional web host name, "finance." However, the mobile web landing page may be mapped to the conventional web host if the keyword "quot" is present in the metadata available for that host. The frequency of occurrence of the term being matched, and the relative importance of the anchor in which it is matched is generally considered while deciding which conventional web host a particular landing page maps to.

The metadata may also be stored in Host Trust Database 336, and/or in other data bases. This host trust information, along with anchors and other metadata is generally available based on evaluation of conventional web hosts. The evaluation may depend on the popularity of conventional web hosts, number of links to the conventional web hosts, and/or other information determined by conventional web crawlers and other analysis of conventional web hosts. The host trust information may be used to enhance the searchable content of mobile web URLs for which web hosts have been identified. This may increase the comprehensiveness and relevance of results returned in a mobile web search index.

In addition to identifying a conventional web host to obtain ratings, relevance, and/or other data, the conventional web host URL can be listed in a search index as associated with a corresponding mobile web landing page URL. Although the conventional web data may, or may not be accessible with a mobile device, a listing of the conventional web host URL may enable a mobile user to recognize alternate sources of information available through a conventional browser running on a higher capability device. Listing the conventional web host URL may also enable the mobile device user to make a judgment as to the quality of a corresponding mobile web landing page listed in the search index. Display space may be a factor in selectively displaying the conventional web host name, conventional web host URL, or other data associated with the conventional web host.

Mapper 330 is in communication with a Mobile Web Host Database 338, which stores landing page URLs and mapping data that associates the landing page URLs to corresponding conventional web host data.

To further enhance the search relevance of identified landing pages, a Category Tagger 340 accesses Mobile Web Host Database 338 and attempts to associate the landing pages with conventional web categories. Categories generally classify conventional web data by search topics. Categories need not be limited to a particular domain or host. Categories may comprise topics that overlap conventional web hosts or may comprise subset topics within a conventional web host. Categories may be determined automatically in analyzing conventional web data, or may be manually defined and assigned to conventional web data. For example, a directory server (not shown) may determine categories based on the content of conventional web pages stored by a convention web host. The category information can be stored by the directory server in a Category Database 342.

Category Tagger 340 is in communication with Category Database 342, and evaluates landing page URLs, corresponding keywords, and corresponding host data to determine which conventional web categories are relevant to the landing pages. The evaluation may be performed by matching known category names or other category information with keywords or host data associated with the landing page URLs. As above, the frequency of a keyword, the hierarchical position of a landing page URL, and/or other criteria may be used to associate categories to the landing page URLs.

A resulting mobile web search index 350 receives each URL available through Crawler 310. Amongst these, each landing page URL is received with its associated token(s), associated conventional web host(s), meta information associated with mapped web host(s), and associated conventional web category(ies). The token(s), host(s), meta information associated with mapped web host(s), and category(ies) in the mobile web search index are used to determine a list of most relevant mobile web landing page URLs to return in response to a search request from a mobile device. Submitted search terms may be matched with the token(s), host(s), meta information associated with mapped web host(s), category(ies), and other prioritization methods may be employed to determine the most relevant mobile web landing pager URLs to return.

Illustrative Logic

Figure 4:
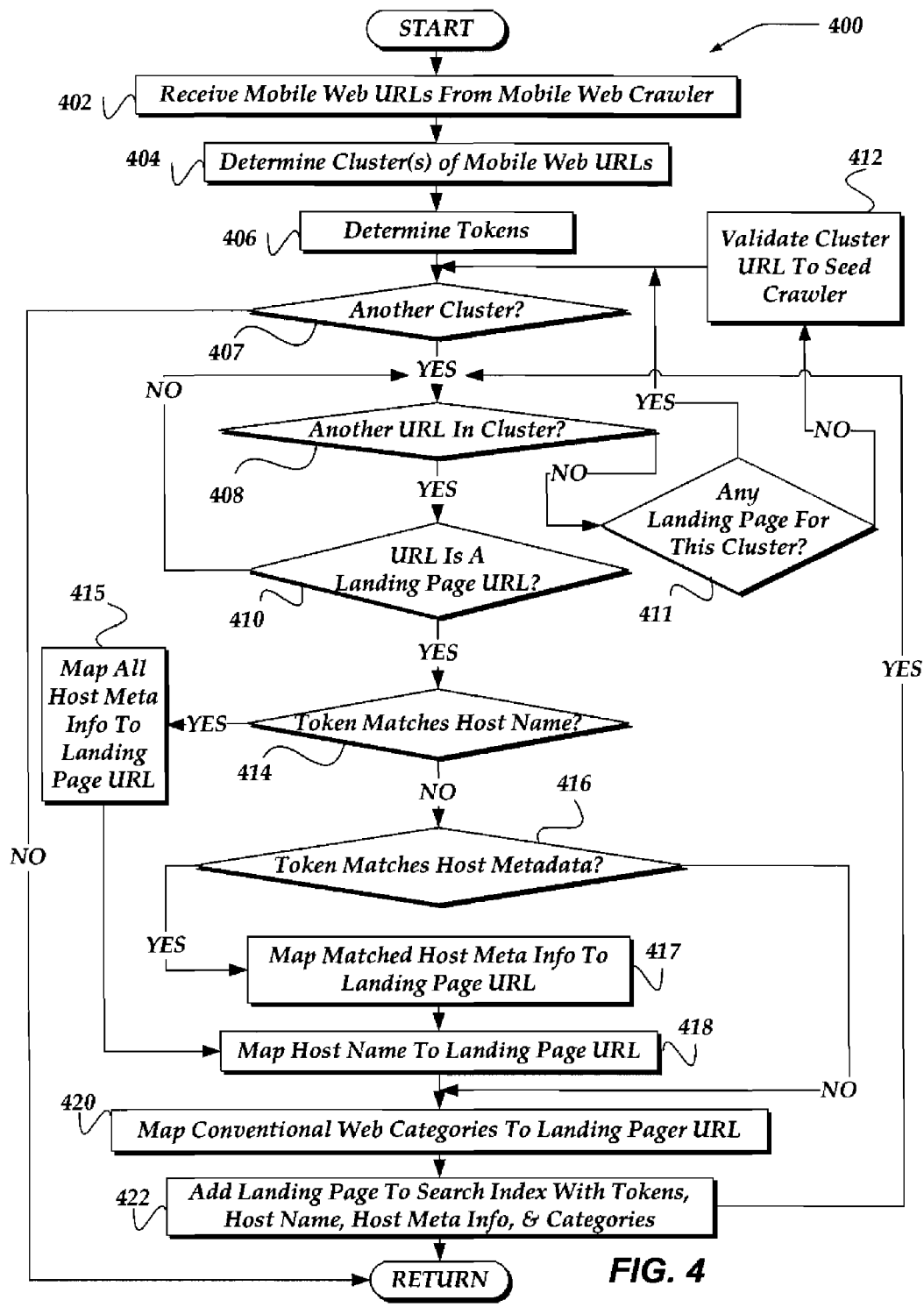
FIG. 4 illustrates a logical flow diagram generally showing one embodiment of an overview process for providing a mobile web site search index, in accordance with various embodiments.

FIG. 4 illustrates a logic flow diagram 400 generally showing one embodiment of an overview process for providing a mobile web site search index, in accordance with various embodiments. Each illustrated block generally corresponds to an operation performed by one or more software and/or hardware modules, but may include manual operations.

At a block 402, the URL Analyzer receives a plurality of mobile web URLs from a mobile web crawler. The mobile web URLs may be associated with an individual domain. The URL Analyzer determines clusters of mobile web URLs at a block 404. The URL Analyzer may consider all of the mobile web URLs for a domain together and generate clusters based on a hierarchical structure of the URLs. Cluster URLs may be selected based in part on positions in the hierarchical structure. At a block 406, the URL Analyzer also determines keywords or other tokens from the mobile web URLs. Keyword generation generally looks for mobile web pages in clusters below and above a current cluster, and accordingly propagates keyword information. This is meant to reduce the likelihood of the same keyword being associated with multiple clusters, and to increase the likelihood that a cluster gets tagged with the correct set of keywords.

At decision block 407, processing of each cluster begins. At a decision block 408, the Landing Page Identifier begins processing each URL belonging to a cluster. While another URL remains to be processed for a cluster, the Landing Page Identifier determines whether the current URL should be identified as a landing page URL, at a decision block 410. Based on the clusters generated by the URL Analyzer, the Landing Page Identifier evaluates the cluster URLs to identify mobile web pages considered important for the domain. The Landing Page Identifier makes use of the cluster information, along with number of pages found under a cluster URL, presence of certain standard keywords and mobile specific keywords in the cluster URL to identify landing pages. In addition, if landing pages are found within different clusters at the same depth having similar structure, the Landing Page Identifier tries to determine landing pages for other clusters at the same depth, for which no landing page has been identified.

If a current URL is identified as a landing page URL, the Mapper accesses a list of host names that are associated with the same domain as the landing page URL. At a decision block 414, the Mapper determines whether one of the domain host names closely matches a token associated with the landing page URL. If a close match exists, the Mapper maps the matching host name to the landing page URL, at a block 418. In such a case, meta information belonging to the mapped web host is associated with this landing page, at a block 415. However, if a close match does not exist based on the token, the Mapper accesses metadata associated with each domain host name. The metadata may include anchor text. At a decision block 416, the Mapper determines whether the token matches, or is substantially related to, the metadata and/or anchor text. If a match or relationship exists, the Mapper maps the matching host name to the landing page URL, at block 418, Meta information belonging to the mapped web host, which matched the token/keywords used in this step, is associated with this landing page, at a block 417. However, if a match or relationship does not exist, a host name may not be associated with the landing page URL.

At a decision block 411, if no landing pages are identified for the current cluster, the Seed List Generator validates corresponding current cluster URL, at a block 412. The URL for a validated Cluster URL can be submitted as a seed URL to the mobile web crawler for further evaluation of cluster URL associated with the seed URL. Cluster URLs that do not pass validation are discarded.

At a block 420, the Category Tagger accesses a list of conventional web categories and determines whether any of the conventional web categories are related to the landing page URL. To make this determination, the Category Tagger may use the tokens associated with the landing page URL and/or any domain host name that was determined to be associated with the landing page URL.

At a block 422, the landing page URL is added to the search index along with any tokens, host name, meta information about mapped host and/or categories associated with the landing page URL. Control then returns to block 408 to determine whether additional cluster URLs are available for processing. Processing is complete all cluster URLs have been processed.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent is:

1. A method for providing a search index, comprising:
   identifying a landing page uniform resource locator (URL) from among a plurality of mobile web page URLs that correspond to a plurality of mobile web pages accessible with a limited capability browser application of a limited capability computing device;
   associating the landing page URL with a web host based at least in part on a token determined from the landing page URL, wherein the web host includes web pages, the web pages being accessible with a browser application of a general purpose computing device but not accessible with a limited capability browser application of a limited capability mobile device;
   associating the landing page URL with a web category based at least in part on the web host, wherein the web category identifies a content topic shared by web pages, the web pages being accessible with a browser application of a general purpose computing device but not accessible with a limited capability browser application of a limited capability mobile device; and
   providing the landing page URL, the token, information associated with the web host, and the category to a search index that is used to associate a search term with the landing page URL based at least in part on at least one of the token, the web host, or the category.

2. The method of claim 1, wherein identifying the landing page URL comprises:
   determining a cluster of mobile web page URLs from among the plurality of mobile web page URLs, wherein the cluster is determined at least in part based on a parameter that exists in each web pager URL in the cluster;
   selecting a cluster URL from among the cluster of mobile web pager URLs, wherein the cluster URL represents the cluster;
   determining a token from the cluster URL, wherein the token is determined at least in part based on a frequency with which the token appears in the cluster of mobile web page URLs; and
   determining whether the cluster URL satisfies at least one landing page criterion.

3. The method of claim 2, wherein the cluster URL is selected at least in part based on at least one of the following:

a number of mobile web page URLs that have a lower position in a hierarchical tree of URLs relative to the cluster URL; and a frequency with which the cluster URL is identified in mobile web pages corresponding to the plurality of mobile web page URLs.

4. The method of claim 2, wherein the at least one landing page criterion comprises at least one of the following:
a number of levels below the cluster URL in a hierarchical tree of the plurality of mobile web page URLs; and
a match between the token and a predefined keyword indicating a landing page.

5. The method of claim 1, wherein the landing page URL and the web host are associated with a same domain.

6. The method of claim 1, wherein associating the landing page URL with the web host comprises:
accessing a list of web host names associated with a domain that is also associated with the landing page URL;
determining the web host from the list if the token matches one of the web host names; and
determining the web host based on a match between the token and metadata associated with the web host if the token does not match any of the web host names in the list.

7. The method of claim 1, wherein the token comprises at least one of the following:
a directory path parameter and a query parameter.

8. The method of claim 1, wherein associating the landing page URL with the web category comprises at least one of the following:
matching the web host to the web category from a list of web categories determined from web pages that are not accessible by a limited capability device; and
matching the token to the web category from a list of web categories determined from web pages that are not accessible by a limited capability device.

9. The method of claim 1, further comprising:
validating a mobile web page associated with one a non-landing page URL from among the plurality of mobile web page URLs that is not identified as the landing page URL; and
submitting the non-landing page URL as a seed to a crawler.

10. The method of claim 1, wherein the plurality of mobile web pages are accessible with a micro browser of a limited capability computing device, and wherein the web pages of the web host and the web pages of the shared content topic are not accessible with the micro browser.

11. A non-transitory computer readable storage medium storing computer readable instructions that instruct a processor to perform a plurality of operations, including the steps of:
identifying a landing page uniform resource locator (URL) from among a plurality of mobile web page URLs that correspond to a plurality of mobile web pages accessible with a limited capability browser application of a limited capability computing device;
associating the landing page URL with a web host based at least in part on a token determined from the landing page URL, wherein the web host includes web pages, the web pages being accessible with a browser application of a general purpose computing device but not accessible with a limited capability browser application of a limited capability mobile device;
associating the landing page URL with a web category based at least in part on the web host, wherein the web category identifies a content topic shared by web pages, the web pages being accessible with a browser application of a general purpose computing device but not accessible with a limited capability browser application of a limited capability mobile device; and
providing the landing page URL, the token, information associated with the web host, and the category to a search index that is used to associate a search term with the landing page URL based at least in part on at least one of the token, the web host, or the category.

12. The non-transitory computer readable storage medium of claim 11 further storing computer readable instructions that instruct the processor to perform the steps of:
determining a cluster of mobile web page URLs from among the plurality of mobile web page URLs, wherein the cluster is determined at least in part based on a parameter that exists in each web pager URL in the cluster;
selecting a cluster URL from among the cluster of mobile web pager URLs, wherein the cluster URL represents the cluster;
determining a token from the cluster URL, wherein the token is determined at least in part based on a frequency with which the token appears in the cluster of mobile web page URLs; and
determining whether the cluster URL satisfies at least one landing page criterion.

13. A server for providing a search index, comprising:
a transceiver for receiving and for sending information over a network;
a processor in communication with the transceiver; and
a memory storing program code that is operative to cause the processor to automatically perform actions comprising:
identifying a landing page uniform resource locator (URL) from among a plurality of mobile web page URLs that correspond to a plurality of mobile web pages accessible with a limited capability browser application of a limited capability computing device;
associating the landing page URL with a web host based at least in part on a token determined from the landing page URL,
wherein the web host includes web pages, the web pages being accessible with a browser application of a general purpose computing device but not accessible with a limited capability browser application of a limited capability mobile device;
associating the landing page URL with a web category based at least in part on the web host, wherein the web category identifies a content topic shared by web pages, the web pages being accessible with a browser application of a general purpose computing device but not accessible with a limited capability browser application of a limited capability mobile device; and
providing the landing page URL, the token, information associated with the web host, and the category to a search index that is used to associate a search term with the landing page URL based at least in part on at least one of the token, the web host, or the category.

14. The server of claim 13, wherein the memory further stores program code that is operative to cause the processor to automatically perform actions comprising:
determining a cluster of mobile web page URLs from among the plurality of mobile web page URLs, wherein the cluster is determined at least in part based on a parameter that exists in each web pager URL in the cluster;

selecting a cluster URL from among the cluster of mobile web pager URLs,
wherein the cluster URL represents the cluster; determining a token from the cluster URL,
wherein the token is determined at least in part based on a frequency with which the token appears in the cluster of mobile web page URLs; and
determining whether the cluster URL satisfies at least one landing page criterion.

15. The server of claim 14, wherein the at least one landing page criterion comprises at least one of the following:
a number of levels below the cluster URL in a hierarchical tree of the plurality of mobile web page URLs; and
a match between the token and a predefined keyword indicating a landing page.

16. The server of claim 13, wherein the landing page URL and the web host are associated with a same domain.

17. The server of claim 13, wherein the memory further stores program code that is operative to cause the processor to automatically perform actions comprising:
accessing a list of web host names associated with a domain that is also associated with the landing page URL;
determining the web host from the list if the token matches one of the web host names; and
determining the web host based on a match between the token and metadata associated with the web host if the token does not match any of the web host names in the list.

18. The server of claim 13, wherein the token comprises at least one of the following:
a directory path parameter and a query parameter.

19. The server of claim 13, wherein the memory further stores program code that is operative to cause the processor to automatically perform actions comprising:
matching the web host to the web category from a list of web categories determined from web pages that are not accessible by a limited capability device; and
matching the token to the web category from a list of web categories determined from web pages that are not accessible by a limited capability device.

20. A system for providing a search index, comprising:
a first set of one or more network devices configured to include one or more web crawlers useable to perform searches and to provide one or more web page uniform resource locators (URLs); and
a second set of one or more network devices, comprising:
a uniform resource locator (URL) analyzer that determines a cluster of mobile web page URLs that correspond to a plurality of mobile web pages accessible with a limited capability computing device, and
wherein the URL analyzer determines a token based at least in part on a parameter of the mobile web page URLs;
a landing page identifier that identifies a landing page URL from the cluster;
a mapper that maps the landing page URL to a web host based at least in part on a token determined from the landing page URL, wherein the web host includes web pages, the web pages being accessible with a browser application of a general purpose computing device but not accessible with a limited capability browser application of a limited capability mobile device; and
a category tagger that associates the landing page URL with a web category based at least in part on the web host, wherein the web category identifies a content topic shared by web pages, the web pages being accessible with a browser application of a general purpose computing device but not accessible with a limited capability browser application of a limited capability mobile device; and
the search index including the landing page URL, the token, information associated with the web host, and the category, the search index being accessible by a search service to associate a search term with the landing page URL based at least in part on at least one of the token, the web host, or the category, and wherein the search term is submitted through a limited capability browser application of a limited capability device.

21. The system of claim 20, wherein the web crawlers further access the plurality of mobile web pages to obtain the mobile web page URLs.

* * * * *